UNITED STATES PATENT OFFICE.

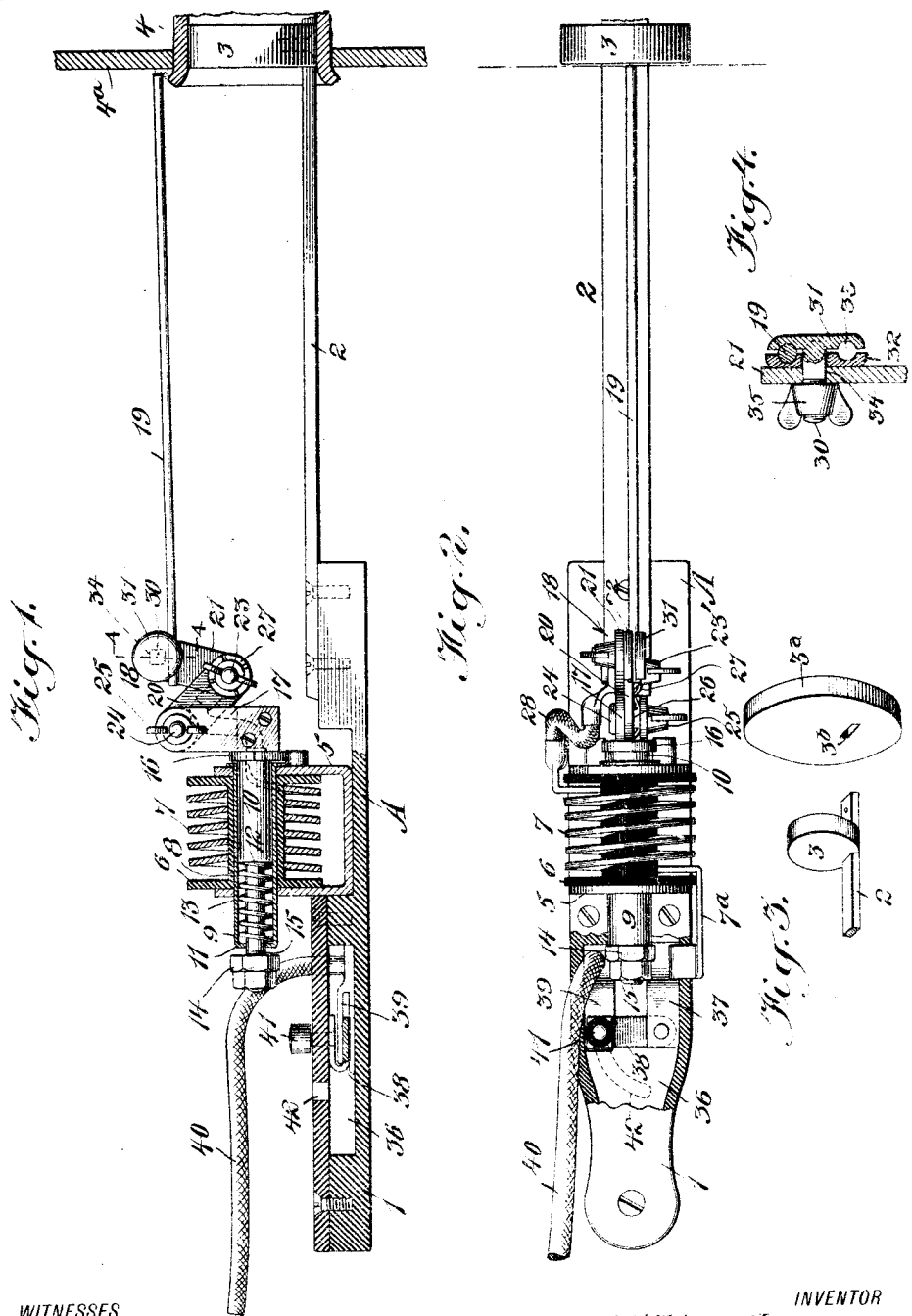

WILLIAM H. DRALLE, OF SCHENECTADY, NEW YORK.

METALLIC ELECTRIC WELDER.

1,128,116.  Specification of Letters Patent.  Patented Feb. 9, 1915.

Application filed July 25, 1914. Serial No. 853,082.

*To all whom it may concern:*

Be it known that I, WILLIAM H. DRALLE, a citizen of the United States, and a resident of Schenectady, in the county of Schenectady and State of New York, have invented a new and Improved Metallic Electric Welder, of which the following is a full, clear, and exact description.

This invention relates to the art of electric welding, wherein the active electrode is a metal rod or wire which is so held that one extremity becomes the one element of the welding arc while the other element is the work to be welded.

The general object of the present invention is the provision of an electric welder which embodies means whereby the active electrode by being placed into contact with the work completes a circuit for the flow of current and thereby a solenoid is energized which draws the active electrode far enough out of contact with the work so as to spring the welding arc, which arc vaporizes the electrode and causes the material to be deposited on the work to form a weld or joint. After the arc is thus created the operator gradually feeds the electrode as it is consumed during the process of completing the weld, but if, however, by mistake in the feeding the arc is extinguished, the operator merely brings the electrode again into contact with the work to cause the electrode to be automatically separated therefrom the proper distance to develop the arc.

The invention has for its specific objects to provide a practical tool to accomplish the results above set forth, such tool comprising a current coil in circuit with the electrode in either leg of the circuit so that the welding current will flow through the coil, which has a core connected with the electrode holder so as to remove the electrode away from the work far enough to develop the welding arc. Coöperating with the current or solenoid winding is a spring which tends to move the core and electrode toward the work so as to maintain the arc gap constant during the process of welding, but when the limit of movement of the core is reached by the spring and the electrode is not manually fed at the desired rate, the arc will become extinguished, so that it will be necessary for the operator to again bring the electrode into contact with the work.

Still another object of the invention is the provision of a welding tool which embodies a rest that is adapted to engage the work so as to hold the tool steady with respect to the point to be welded, said rest or work-engaging means being interchangeable for adapting the tool for different kinds of work; and furthermore, the electrode holder is adjustable for the same purpose.

With such objects in view, and others which will appear as the description proceeds, the invention comprises various novel features of construction and arrangement of parts which will be set forth with particularity in the following description and claims appended hereto.

In the accompanying drawing which illustrates one embodiment of the invention, and wherein similar characters of reference indicate corresponding parts in all the views, Figure 1 is a side view of the welder with portions in section; Fig. 2 is a plan view thereof with a part of the handle in section to show the switch for throwing on or off the current; Fig. 3 is a perspective view of the work-engaging end of the tool with one of the work-engaging devices or rests removed; and Fig. 4 is a sectional view on the line 4—4, Fig. 1 through the electrode clamp.

In the present instance the tool is shown as adapted for use in electrically welding joints between boiler tubes and the flue sheets, but it is to be understood that it can be used for other purposes.

Referring to the drawing, A designates the base of the tool which is a body of suitable insulation. One end of this base piece may be formed conveniently into a handle 1, while the opposite end is provided with a rod 2 which is adapted to have work-engaging means applied to the extremity thereof. The work-engaging means in the present instance is shown as a disk 3, which is a non-conductor and is so shaped as to fit within a boiler tube 4, so as to hold the operative portion of the tool steady with respect to the work. On the base A is a frame or other support 5 which carries a spool 6 of insulation, there being on the spool a coil 7 of edgewise-wound conducting material of suitable cross-sectional area to carry the welding current. Passing through the bore 8 of the spool is a fixed tube 9 that contains a slidable core 10 which responds to the magnetism produced by the current flowing through the solenoid coil 7. Between the end 11 of the tube and shoulder 12 of the core is a spring 13 which urges the core in the direction of the work. The tension of the spring can be adjusted by means of a nut or equivalent device 14 on the stem portion 15 of the core which extends out of the tube 9. The movement of the core against the tension of the spring 13 is limited by a shoulder 16, such shouldered end of the core being provided with an upwardly-extending arm 17 that carries a holder 18 for the electrode 19. This holder is shown in the form of a pair of links 20 and 21 which are hingedly connected together by a bolt 23 which has a wing-nut 23'. The member 20 of the electrode holder is hingedly connected to the arm 17 by a bolt 24 which has a wing-nut 25, there being a spring washer 26, as shown in Fig. 2, so as to maintain a firm clamping action. The bolt 23 also has a spring washer 27 which affords a good electrical connection between the flexible connecting element 28 which electrically connects the solenoid coil 7 with the electrode holder, the connecting element 28 being flexible, as the electrode holder is adjustable by changing the angular relation of the members 20 and 21 with respect to each other and the relation of the member 20 with respect to the post 17, according to the desired position of the electrode. The electrode holder includes a clamp constructed as shown in Fig. 4, such clamp consisting of a bolt 30 which is provided with a head 31 that cooperates with a clamping disk or washer 32 arranged on the squared shank of the bolt, the said head 31 and washer 32 being provided with grooves 33 in their opposed faces so as to receive the electrode 19, and on the shank of the bolt which extends through an opening 34 in the member 21 of the electrode holder is a wing nut 35.

The handle of the tool is provided with a chamber 36 which contains a switch for throwing on or off the current. This switch comprises a hinge post or member 37, to which is pivotally connected the blade 38 of the switch that is moved into and out of engagement with the fixed contact or spring jaws 39 of the switch, such jaws being connected by a cable 40 with the usual welding outfit or regulating means. The blade has a knob 41 or equivalent means which extends out of the slot 42 in the handle, so that the operator can conveniently open and close the switch. The coil 7 has its terminal 7ᵃ connected with the member 37 of the switch, so that when the switch is closed current will pass through the coil.

When the tool is to be used for welding the joints of superheater tubes, a larger disk 3ᵃ is arranged on the end of the rod or bar 2, as the disk is provided with a slot 3ᵇ to receive such rod. Obviously other work-engaging means may be applied to the bar 2 for guiding the movement of the tool in the process of making the weld.

In using the tool the work-engaging element 3 thereof is inserted in the boiler tube, as shown in Fig. 1, and the electrode 19 is engaged with the tube sheet 4ᵃ to complete the electric circuit, it being understood that the boiler is connected with the one side of the circuit. This causes current to flow through the coil 7 of the tool, which thereby becomes energized and actuates the core 10 in a direction to separate the electrode 19 from the tube sheet 4ᵃ. An arc is thus provided and the welding action begins. The operator now gradually turns the tool so that the electrode will travel around the joint between the tube and tube sheet, and as this turning proceeds, the tool is fed forwardly just as fast as the electrode is consumed. If, however, the forward feed is not at the proper rate, the current through the solenoid will be diminished by reason of the widened arc gap, and consequently the spring 19 will come into action to feed the electrode forwardly with a tendency to maintain the arc constant. If, however, the feed is not properly maintained the spring will reach the limit of its action and the arc will become extinguished. It is now necessary for the operator to feed the tool forwardly far enough to engage the electrode 19 with the work, whereby the solenoid is again brought into action and the electrode separated far enough to spring the welding arc. If desired, the parts that carry the current, such as the coil 7 and electrode holder, may be inclosed in a casing as a protection. The tool is so designed that the tubes close to the walls of a fire-box and crown sheet can be welded with facility.

From the foregoing description taken in connection with the accompanying drawing, the advantages of the construction and method of operation will be readily understood by those skilled in the art to which the invention appertains, and while I have described the apparatus which I now consider to be the best embodiment thereof, I desire to have it understood that the apparatus shown is merely illustrative, and that such changes may be made when desired as are within the scope of the appended claims.

Having thus described my invention, I claim as new and desire to secure by Letters Patent:

1. A metallic electric welder for welding tubes in apertures of plates and the like, comprising a supporting structure, a work-engaging disk carried thereby and adapted to enter a tube to be welded, whereby the welder can be turned about the center of the disk as an axis, an electrode holder on the supporting structure and insulated from the said disk, a metallic electrode mounted in the holder and eccentric to the axis about which the welder turns, whereby a circular weld can be produced by the electrode upon the turning of the welder in relation to the work, and means for supplying current through the electrode.

2. A metallic electrode welder comprising an electrode holder, a supporting structure having work-engaging means, a solenoid having a core on which the said holder is mounted, a connection between the solenoid and electrode holder, whereby the solenoid is energized when the electrode is moved into engagement with the work and the core retracted to move the electrode out of contact with the work to produce a welding arc, and a spring acting on the core for moving the electrode toward the work.

3. A metallic electric welder comprising a supporting structure having a handle, work-engaging means on the said structure, a solenoid on the structure, a switch on the structure for connecting the solenoid, and an electrode holder carried by the core of the solenoid, whereby the holder is retracted to move the electrode out of engagement with the work upon the initial flow of current through the welder, whereby the welding arc is produced.

4. A hand tool for electric welding, comprising a supporting structure, an insulating work-engaging means on the structure, a metallic fusible electrode, an electro-mechanical device carrying the electrode and connecting the same with a source of current, said device consisting of means for automatically retracting the electrode out of contact with the work for springing a welding arc, and means for automatically feeding the electrode toward the work as the electrode is consumed.

5. An electric welder for making circular welds, comprising a supporting structure, a work-engaging guide carried by the structure and insulated therefrom to serve as a pivot around which the welder is turned, a metallic electrode, and a holder for the electrode mounted on the structure and adjustable to shift the electrode toward or from the axis around which the welder turns in making a circular weld, in combination with a circuit connected with the work and with the electrode.

6. A metallic electrode welder comprising a supporting structure, work-engaging means thereon and made of insulation, an electrode holder on the said structure having a limited movement toward and from the work, a fusible metallic electrode, electrical means traversed by the welding current for automatically moving the holder from the work to produce the welding arc, and means for automatically moving the holder toward the work when the rate of feed of the electrode is less than that required to maintain the arc gap constant.

In testimony whereof I have signed my name to this specification in the presence of two subscribing witnesses.

WILLIAM H. DRALLE.

Witnesses:
ANDREW T. G. WEMPLE,
JOHN H. PETERS.